(12) United States Patent
Chen

(10) Patent No.: US 9,656,710 B2
(45) Date of Patent: May 23, 2017

(54) REARVIEW MIRROR WITH CONCEALED AND LIGHT-TRANSMITTABLE TURN SIGNAL LIGHT

(71) Applicant: SAN YUAN DESIGN CO., LTD., Taoyuan (TW)

(72) Inventor: Ying-Chung Chen, Taoyuan (TW)

(73) Assignee: SAN YUAN DESIGN CO., LTD., Taoyuan (TW)

( * ) Notice: Subject to any disclaimer, the term of this patent is extended or adjusted under 35 U.S.C. 154(b) by 293 days.

(21) Appl. No.: 14/660,895

(22) Filed: Mar. 17, 2015

(65) Prior Publication Data
US 2016/0236742 A1 Aug. 18, 2016

(30) Foreign Application Priority Data

Feb. 17, 2015 (TW) .............................. 104202848 U

(51) Int. Cl.
*B60Q 1/26* (2006.01)
*B60R 1/12* (2006.01)
*B62J 6/00* (2006.01)
*B60Q 1/38* (2006.01)
*B62J 29/00* (2006.01)

(52) U.S. Cl.
CPC ............ *B62J 6/005* (2013.01); *B60Q 1/2665* (2013.01); *B60Q 1/2696* (2013.01); *B60Q 1/38* (2013.01); *B60R 1/1207* (2013.01); *B62J 29/00* (2013.01); *B62J 2300/008* (2013.01)

(58) Field of Classification Search
CPC ...... B60Q 1/2665; B60Q 1/2696; B60R 1/12; B60R 1/1207; B62J 6/00; B62J 6/005; B62J 29/00; B62J 2300/008
USPC ......................................... 362/473–474, 494
See application file for complete search history.

(56) References Cited

U.S. PATENT DOCUMENTS 7,048,420 B2 * 5/2006 Arakawa .............. B60Q 1/2665
362/494

* cited by examiner

Primary Examiner — Jason Moon Han
(74) Attorney, Agent, or Firm — Leong C. Lei

(57) ABSTRACT

Provided is a rearview mirror with concealed and light-transmittable turn signal light, which is applicable to a vehicle to provide a function of a rearview with light reflection achieved with a reflector, and in addition, an outer cover of the rearview mirror is structured to allow for emission of light of turn signal therethrough so as to also provide a function of alarming for driving safety. The outer cover is made of a light-transmitting material and the outer cover has a surface that is subjected to sputtering to form a sputtering-coated film thereon. The outer cover receives therein a light casing, which is fixed to a minor base of the review mirror by fasteners. Electrical wires extend along a rearview mirror bracket to connect to the light base. The mirror base and the light casing are coupled to each other.

6 Claims, 5 Drawing Sheets

REARVIEW MIRROR WITH CONCEALED AND LIGHT-TRANSMITTABLE TURN SIGNAL LIGHT

(a) TECHNICAL FIELD OF THE INVENTION

The present invention relates generally to a rearview mirror with concealed and light-transmittable turn signal light, and more particularly to a fashion rearview mirror structure featuring technology, fashion, and safety, which is subjected to a sputtering operation so that a surface thereof shows an effect of electroplating that exhibits a sensation of high quality and beauty, wherein the outer cover of the rearview mirror, when the turn signal light is energized, allows the blinking light of the turn signal light to emit through a sputtering-coated film that is formed through a special treatment so as to provide the rearview mirror with not just the function of reflection of rear side image, but also serving as an alarming and turn signal light on a front side of a vehicle, making it particularly applicable to transportation vehicles, such as automobiles, motorcycles, electrical bicycles, and welfare vehicles.

(b) DESCRIPTION OF THE PRIOR ART

A vehicle is often provided with a rearview mirror. An example is a rearview mirror of a motorcycle, which allows a motorcycle rider, when riding a motorcycle, to see image reflection with the mirror in order to get aware of the movements of approaching vehicles from the rear side of the motorcycle so as to provide the rider with a reference for timely making action in changing moving direction. As such, riding safety can be enhanced.

However, most of the rearview mirrors that are available in the market for motorcycles only provide a single function of a mirror for reflection of rear side image. No design has been proposed for a rearview mirror to additionally include a turn signal light mounted thereto. A side view mirror of an automobile is generally larger in size than a motorcycle rearview mirror and this makes it possible and already available to include a turn signal light mounted thereto. For example, an automobile side view mirror that is currently available comprises an outer cover on which a structure is provided for mounting a turn signal light thereon, where a surface of the outer cover of the side view mirror is provided with a light-emitting diode (LED) light bar mounted thereon. Since the LED light bar is composed of a number of LEDs. The LEDs gives of blinking light when energized together with a regular turn signal light of the automobile in order to provide an effect of alarming on two opposite sides of the automobile for indicating change of direction in the movement of the automobile, for the purpose of signaling vehicles and pedestrians around. However, a major reason that LEDs have been used as signal light mounted on the automobile side view mirror is simply that the LEDs have a small size so that a height of outward projection of an exposed LED light bar may not be large and thus does not become an a sudden change of the outside contour of the side view mirror. However, the LEDs are arranged in such a way that the light emitting therefrom is directly projected outward so as to exhibit a strong intensity of light, which may cause undesired irritation to the eyes of other drivers and pedestrians and may thus cause unexpected influence on driving safety. In addition, in the outside appearance, the LED light bar and the LEDs are all exposed outside on the surface of the outer cover of the side view mirror, making it not aesthetic.

In view of the above problems, the present invention aims to provide a solution to address the above-discussed drawbacks by providing a rearview mirror with concealed and light-transmittable turn signal light, wherein the outside appearance of the rearview mirror shows a visual effect of beauty of electroplating and at the same time, allows the turn signal light to emit outward so that an effect of electroplating is exhibited when the turn signal light is not energized and a function of blinking of turn signal is achieved when the turn signal is activated.

SUMMARY OF THE INVENTION

The primary object of the present invention is to provide a rearview mirror with concealed and light-transmittable turn signal light, which provides a novel rearview mirror product design having functions of both a turn signal light and a rear view mirror, wherein a surface of an outer cover normally shows, in the outside appearance thereof, a sensation of quality of a delicate electroplating-like mirror surface so that when a turn signal light of a vehicle is activated, a light bulb accommodated therein blinks a turn signal that is emitted out through a specially processed electroplating film to achieve an effect of blinking of the turn signal light on a front side of the vehicle and thus an excellent effect of alarming for direction change displayed on the front side of the vehicle, where a unique sensation of innovation can also be achieved.

Another object of the present invention is to provide a rearview mirror with concealed and light-transmittable turn signal light, wherein with the innovative design of the present invention, a turn signal light combined in a rearview mirror that is of a limited thickness is allowed use a light bulb that is a regular tungsten filament based light bulb for light emission and the turn signal light so emitted is soft and does not cause irritation to eyes of driver or pedestrians moving in the opposite direction that is often caused by a light emitting diode (LED) based light bulb that generally generates intense light by directly projecting light outward, whereby driving safety can be enhanced.

To achieve the objects, the present invention provides a rearview mirror with concealed and light-transmittable turn signal light, which comprises an outer cover, a light casing, and a mirror base and is characterized in that the outer cover is made of a light-transmitting material and has an outer surface in which a light transmitting section is formed, wherein the light transmitting section is subjected to a sputtering process to form a sputtering-coated film on a surface of the outer cover, which allows light to emit from a rear side; the light casing comprises a fitting opening extending therethrough to allow for entry of a light bulb and a light base from the rear side to be securely mounted through fitting engagement between the light base and the fitting opening, the light base being connected at a rear side thereof to electrical wires, the light casing having an outer circumference on which a plurality of mounting holes is provided for being fixed to the outer cover by screws; and the mirror base is coupled to the light casing, the mirror base having an outer surface to which a reflector is mounted.

The light casing has a bottom on which a spherical convex surface is formed. The spherical convex surface comprises a through hole formed therein and extending therethrough. The mirror base is coupled to the light casing through mating engagement between the spherical convex surface and the spherical concave surface with the threaded pillar extending through the through hole to receive a disc washer, a spring, and a screw to mount to the threaded pillar so as to achieve assembly and fixing.

The efficacy of the present invention is to provide a rearview mirror, which in addition to the function of rearview mirror, also serves as a front side turn signal light to enhance driving or riding safety. Rotation of the mirror base is available so as to provide an effect of adjusting and re-orienting the mirror base with respect to the light base, thereby allowing a motorcycle rider to manually adjust the rearview mirror to a proper orientation for image reflection.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
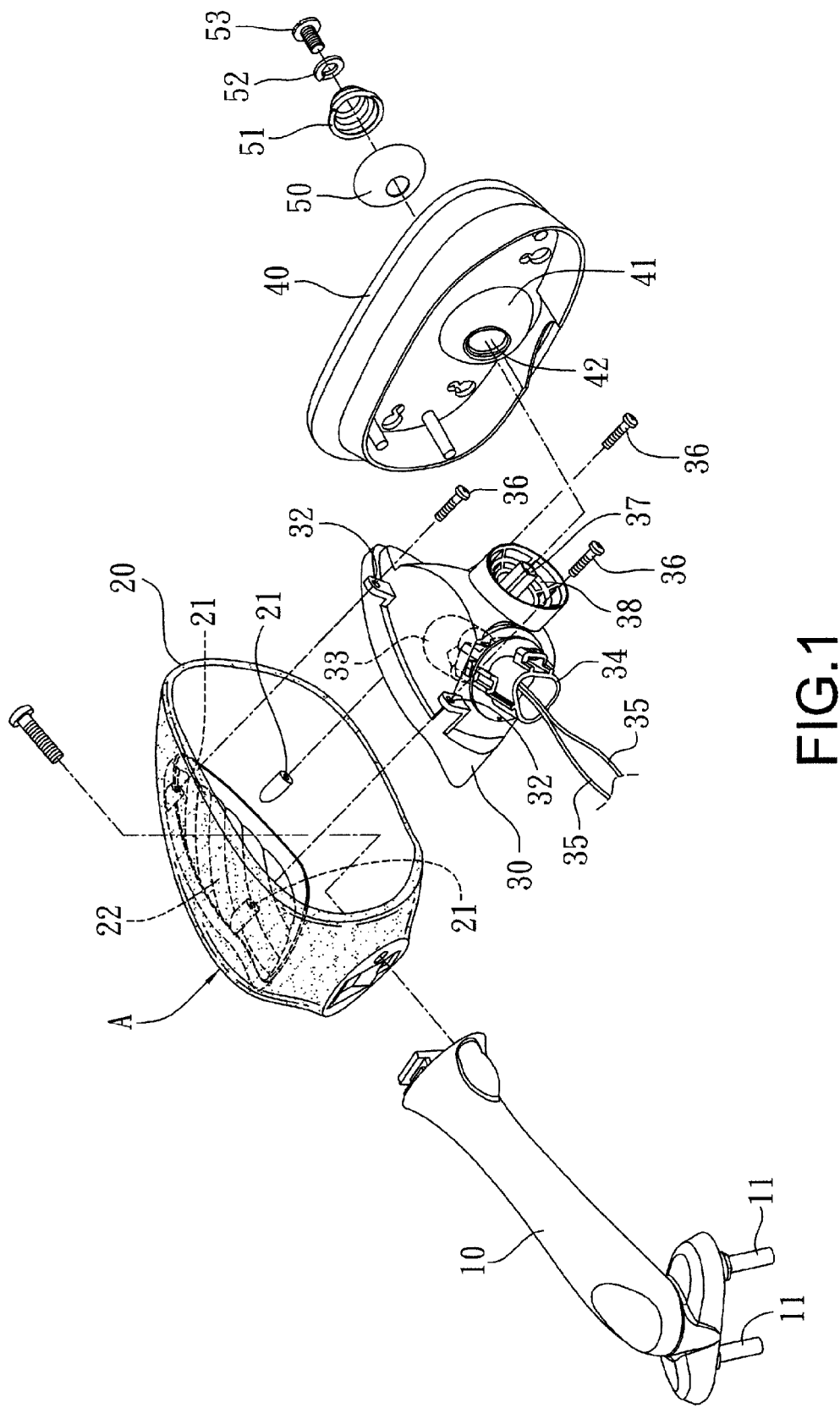
FIG. 1 is an exploded view of the present invention.

An embodiment of the present invention is shown in FIG. 1. The present invention generally comprises a rearview mirror bracket 10, an outer cover 20, a light casing 30, and a mirror base 40. The rearview mirror bracket 10 has an end comprising threaded rods 11 mounted thereto for coupling with a handlebar of a vehicle, such as motorcycle. The rearview mirror bracket 10 has an opposite end to which an outer cover 20 of a rearview mirror is mounted. The outer cover 20 is made of a light-transmitting material and has a surface in which a light transmitting section A is formed. Formed inside the outer cover is a plurality of mounting holes 21 for securely mounting the light casing 30. The surface, in the entirety thereof, is treated with electroplating to show a high quality of sensation, or may alternatively comprise at least one specific area thereon to define the light transmitting section A, wherein the light transmitting section A is subjected to a sputtering process to form a sputtering-coated film 22 on the surface of the outer cover 20, where the film has a thickness that is set to be in the range of 0.1 μm-1 μm. Such a thickness allows the outer cover 20 to show an effect of electroplating of high quality of sensation, but still allowing light to emit from the rear side thereof for an optimum result of use.

Figure 2:
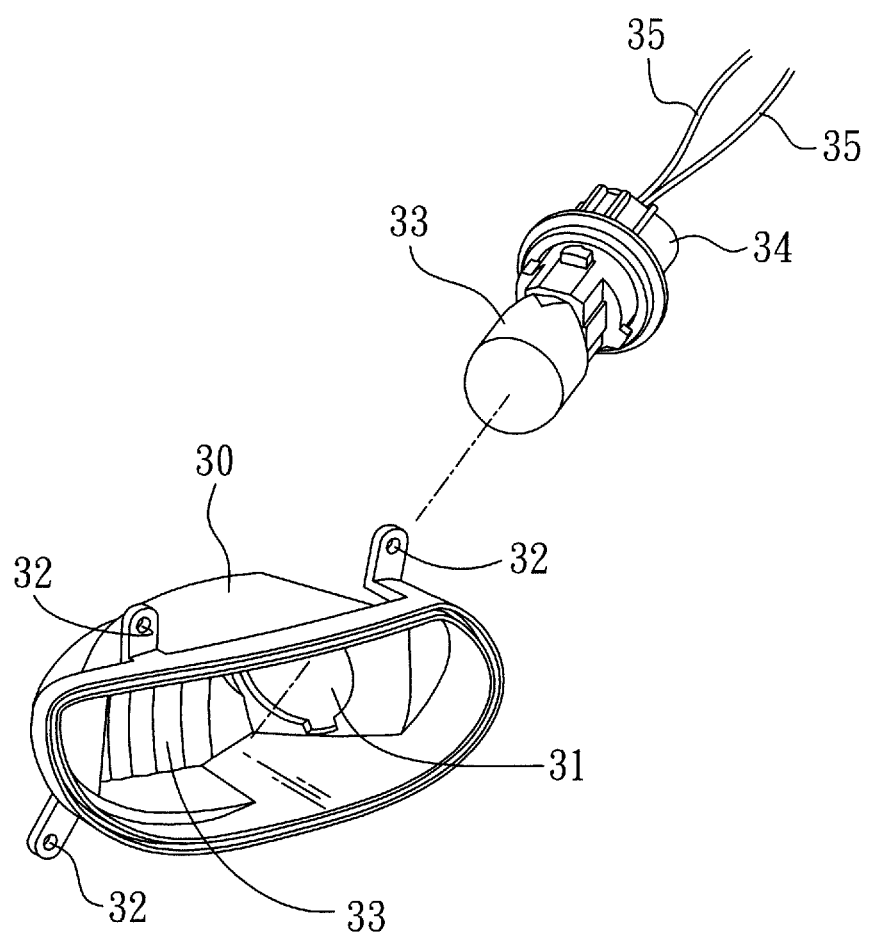
FIG. 2 is a schematic view illustrating assembly of light bulb and light casing according to the present invention.

Referring to FIGS. 1 and 2, the light casing 30 comprises a fitting opening 31 extending therethrough, allowing for the entry of the light bulb 33 and the light base 34 from the rear side to be securely mounted through fitting engagement between the light base 34 and the fitting opening 31. The light base 34 is connected, at a rear side thereof, to electrical wires 35. The light casing 30 has an outer circumference on which a plurality of mounting holes 32 is provided so that screws 36 received through the mounting holes 32 fix the light casing 30 to the outer cover 20 in such a way that the light bulb 33 is set at a location corresponding to the light transmitting section A that comprises the sputtering-coated film 22 thereon so that when it is energized, light emitting therefrom transmits through the sputtering-coated film 22 to give off turn signal lighting. On an end of the light casing 30, a threaded pillar 37 and a spherical concave surface 38 are provided.

Referring to FIG. 1, the mirror base 40 has a bottom that is provided with a spherical convex surface 41 and a through hole 42 is formed in and extends through the spherical convex surface 41. The mirror base 40 is coupled to the light casing 30 through mating engagement between the spherical convex surface 41 and the spherical concave surface 38 with the threaded pillar 37 extending through the through hole 42 to receive a disc washer 50, a spring 51, an anti-loosening washer 52, and a screw 53 to mount to the threaded pillar 37 so as to achieve assembly and fixing. Thus, through rotation of the mirror base 40 by a proper angle, the mirror base 40 is adjustable in position thereof with respect to the light base 30 and this enables a motorcycle rider to manually adjust the rearview mirror to a proper reflection angle.

Figure 3:
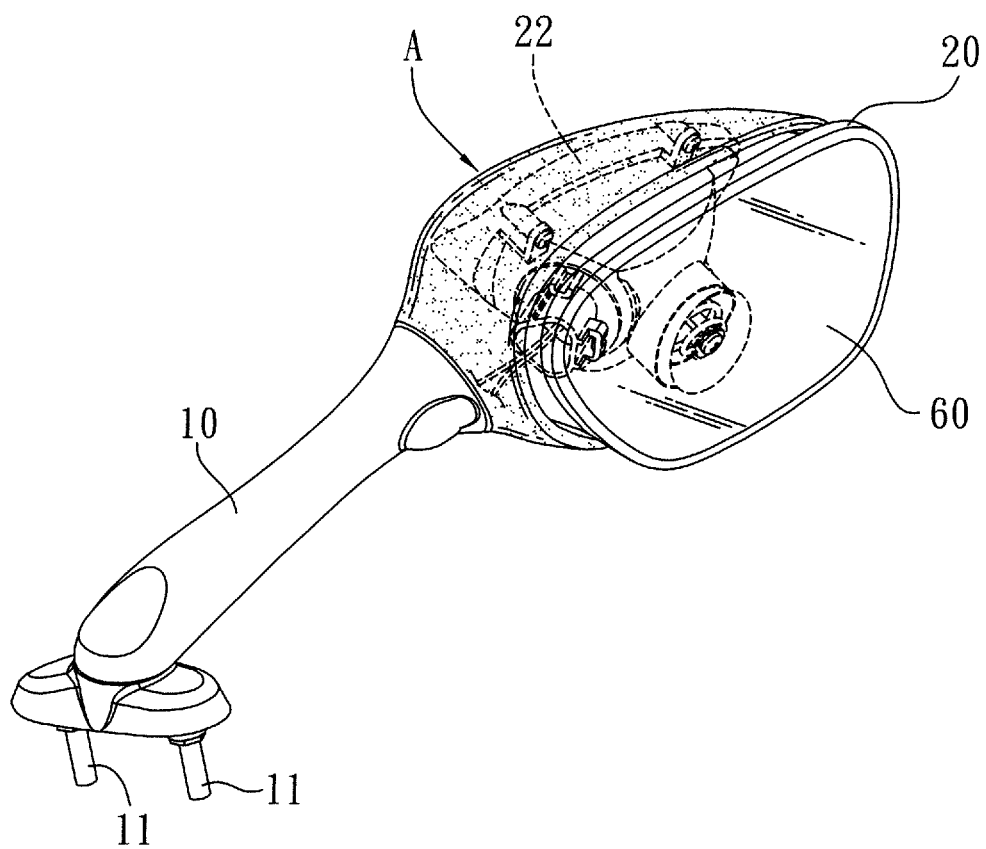
FIG. 3 is a perspective view showing the present invention in an assembled from viewed from the rear side.
Figure 4:
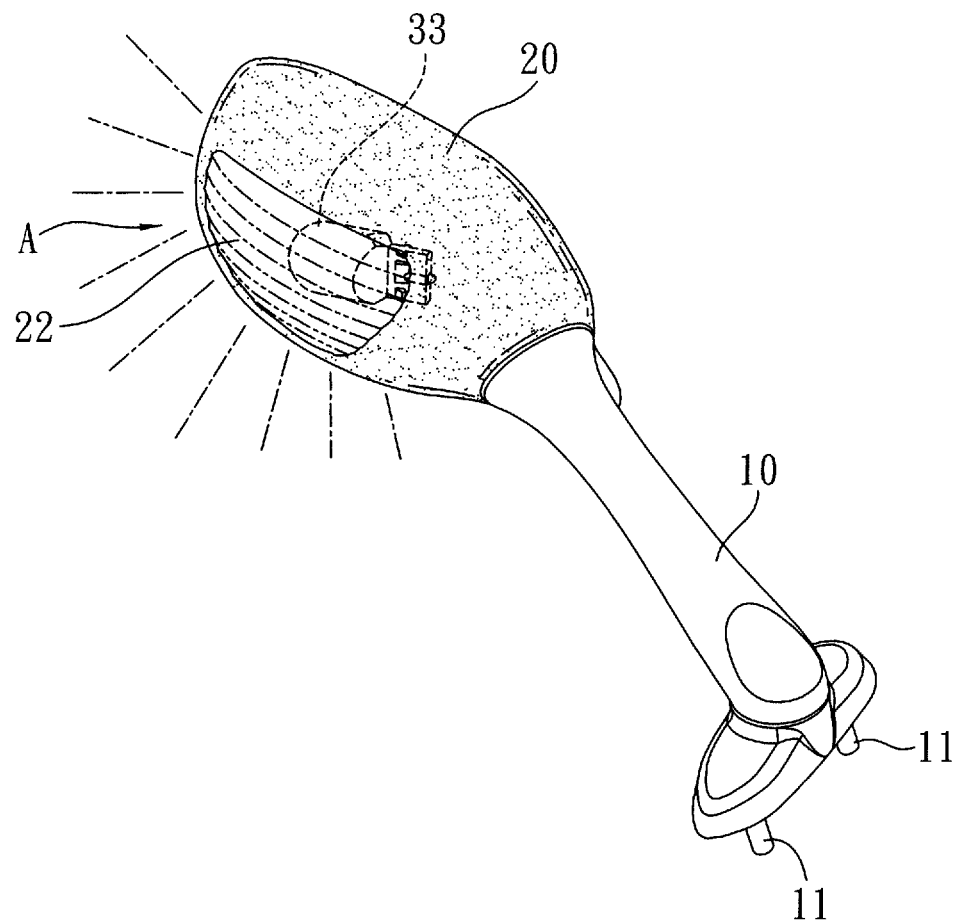
FIG. 4 is a perspective view showing the present invention in an assembled from viewed from the front side.

Referring to FIGS. 3 and 4, perspective views are given to illustrate the present invention in an assembled form. When the rearview mirror bracket 10, the outer cover 20, the light casing 30, the mirror base 40, the disc washer 50, the spring 51, the anti-loosening washer 52, and a bolt 53 are assembled together, a reflector 60 is attached to an outer surface of the mirror base 40 so as to form a rearview mirror that reflects the rear side traffic condition. In the front side of the rearview mirror, the surface treatment through sputtering according to the present invention allows the sputtering-coated film 22 so formed to conceal the light bulb 33, while when the light bulb 33 is energized, the light emitting therefrom may be projected outward to provide turn signal lighting, thereby providing a rearview mirror structure having a light-transmitting metal quality electroplated surface that exhibits sensation of technology and fashion.

Figure 5:
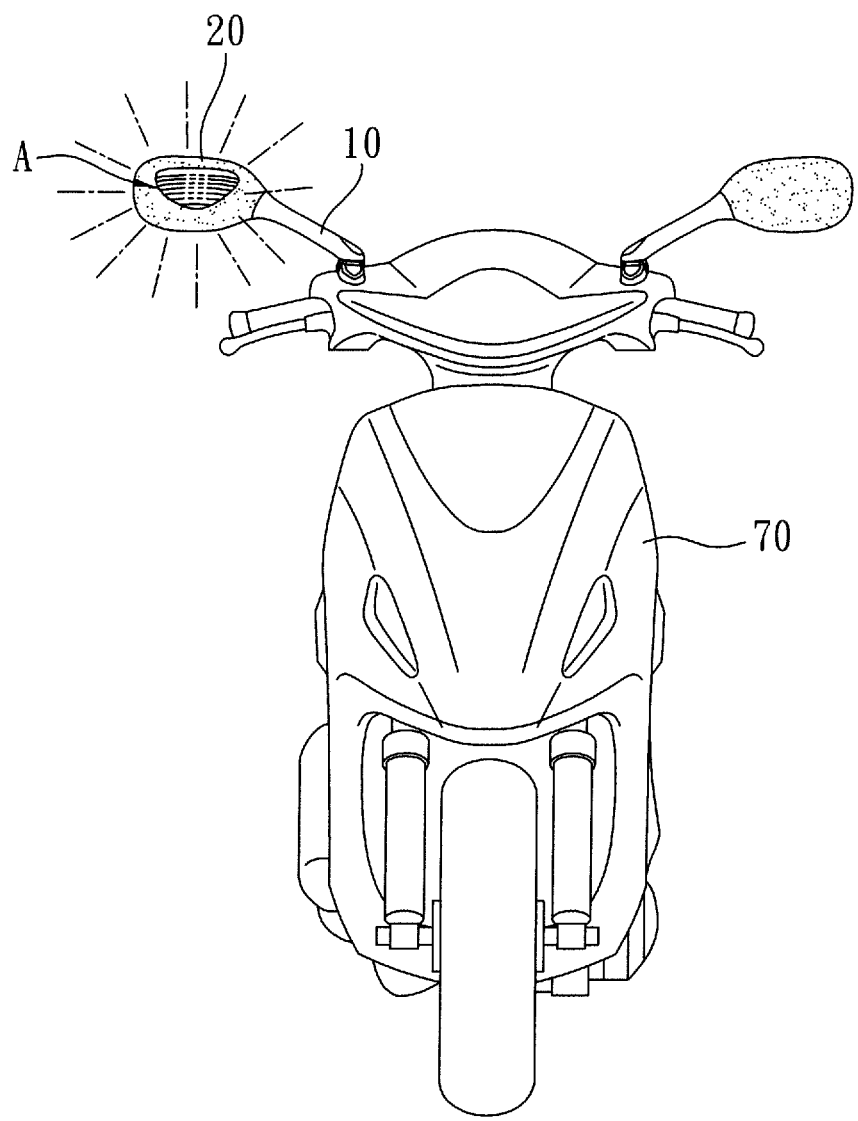
FIG. 5 is a schematic view illustrating the present invention mounted to a motorcycle for illustration of a turn signal light on the left side of the drawing blinking to achieve an alarm effect, while a turn signal light on the right side of the drawing not blinking and exhibiting an appearance of an electroplated surface.

Referring to FIG. 5, when the light bulb 33 received in the rearview mirror is not emitting light, the rearview mirror, in the outside appearance thereof, shows an integral electroplated mirror surface of high quality of sensation. During the operation of a motorcycle 70, when the turn signal is switched on, after energized, the outer cover 20 of the rearview mirror allows light emitting from the concealed light bulb 33 to transmit through the sputtering-coated film 22 so as to give off alarm blinking thereby providing a rearview mirror with lighting effect, which can be regarded as a decoration structure featuring sensation of technology and fashion and safety.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A rearview mirror with concealed and light-transmittable turn signal light, comprising a rearview mirror bracket, an outer cover, a light casing, and a mirror base, characterized in that the outer cover is made of a light-transmitting material and has an outer surface in which a light transmitting section is formed, wherein the light transmitting section is subjected to a sputtering process to form a sputtering-coated film on a surface of the outer cover, which allows light to emit from a rear side;

the light casing comprises a fitting opening extending therethrough to allow for entry of a light bulb and a light base from the rear side to be securely mounted through fitting engagement between the light base and the fitting opening, the light base being connected at a rear side thereof to electrical wires, the light casing having an outer circumference on which a plurality of mounting holes is provided for being fixed to the outer cover by screws; and the mirror base is coupled to the light casing, the mirror base having an outer surface to which a reflector is mounted.

2. The rearview mirror with concealed and light-transmittable turn signal light according to claim 1, wherein the outer cover comprises a plurality of mounting holes formed therein for securely mounting the light casing.

3. The rearview mirror with concealed and light-transmittable turn signal light according to claim 1, wherein the outer cover comprise at least one specific area thereon to define the light transmitting section and the light transmitting section is subjected to the sputtering process to form the sputtering-coated film on the surface of the outer cover, where the film has a thickness that is set to be in the range of 0.1 µm-1 µm.

4. The rearview mirror with concealed and light-transmittable turn signal light according to claim 1, wherein the rearview mirror bracket has an end coupled to the outer cover.

5. The rearview mirror with concealed and light-transmittable turn signal light according to claim 1, wherein the light casing has an end on which a threaded pillar and a spherical concave surface are provided.

6. The rearview mirror with concealed and light-transmittable turn signal light according to claim 1, wherein the mirror base has a bottom that is provided with a spherical convex surface and a through hole is formed in the spherical convex surface, the mirror base being coupled to the light casing through mating engagement between the spherical convex surface and the spherical concave surface with the threaded pillar extending through the through hole to receive a disc washer, a spring, and a screw to mount to the threaded pillar so as to achieve assembly and fixing.

* * * * *